United States Patent
Miyagi

(10) Patent No.: US 10,748,407 B2
(45) Date of Patent: Aug. 18, 2020

(54) NOTIFICATION SYSTEM AND NOTIFICATION CONTROL APPARATUS USED IN THE SAME

(71) Applicant: TOSHIBA TEC KABUSHIKI KAISHA, Shinagawa-ku, Tokyo (JP)

(72) Inventor: Daisuke Miyagi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 16/036,339

(22) Filed: Jul. 16, 2018

(65) Prior Publication Data
US 2019/0027012 A1   Jan. 24, 2019

(30) Foreign Application Priority Data
Jul. 18, 2017 (JP) .................. 2017-139112

(51) Int. Cl.
| | | |
|---|---|---|
| G06F 9/54 | (2006.01) | |
| G08B 21/18 | (2006.01) | |
| G06K 9/00 | (2006.01) | |
| H04W 4/35 | (2018.01) | |
| G06Q 10/00 | (2012.01) | |

(52) U.S. Cl.
CPC .......... *G08B 21/182* (2013.01); *G06F 9/542* (2013.01); *G06K 9/00671* (2013.01); *G06Q 10/00* (2013.01); *H04W 4/35* (2018.02)

(58) Field of Classification Search
CPC ..................................... G06F 9/542
USPC ........................................ 719/318
See application file for complete search history.

(56) References Cited

U.S. PATENT DOCUMENTS

| | | | |
|---|---|---|---|
| 7,327,260 B2 * | 2/2008 | Himberger | G06K 19/0717 235/440 |
| 7,518,511 B1 | 4/2009 | Panja et al. | |
| 8,222,999 B2 | 7/2012 | Hiramatsu et al. | |
| 2002/0170961 A1 | 11/2002 | Dickson et al. | |
| 2006/0006999 A1 * | 1/2006 | Walczyk | A61B 5/1113 340/539.27 |
| 2010/0156606 A1 * | 6/2010 | Gold | H04Q 9/00 340/10.4 |
| 2018/0039799 A1 * | 2/2018 | Steinbrunner | G06K 7/10366 |
| 2018/0315013 A1 * | 11/2018 | Wilkinson | G06Q 10/0832 |

OTHER PUBLICATIONS

Search Report dated Jan. 8, 2019 in corresponding European application No. 18 18 4157.8, 5 pages.

* cited by examiner

*Primary Examiner* — Andy Ho
(74) *Attorney, Agent, or Firm* — Foley & Lardner LLP

(57) ABSTRACT

A notification system includes a detector, an identifier, a notifier, a determination module, and a controller. The detector detects that a commodity is placed at a display location. The identifier identifies the commodity. The notifier executes a notification operation with a plurality of different notification methods. The determination module determines a degree of conformity between the commodity identified by the identifier and the display location at which the commodity is placed. The controller controls the notifier such that the notifier executes the notification operation with one notification method associated to the degree of conformity determined by the determination module from the plurality of notification methods.

18 Claims, 3 Drawing Sheets

FIG. 2

| |
|---|
| DISPLAY LOCATION CODE ~F11 |
| TEMPERATURE SECTION ~F12 |
| READER CODE ~F13 |
| SOUND OUTPUT DEVICE CODE ~F14 |
| MANAGEMENT TERMINAL CODE ~F15 |
| COMMODITY CODE ~F16 |

| | | DISPLAY LOCATION TEMPERATURE SECTION | | | |
|---|---|---|---|---|---|
| | | HEATING | NORMAL TEMPERATURE | REFRIGE-RATING | FREEZING |
| COMMODITY TEMPERATURE SECTION | HEATING | D1 | D1 | D2 | D2 |
| | NORMAL TEMPERATURE | D2 | D1 | D1 | D1 |
| | REFRIGE-RATING | D2 | D1 | D1 | D2 |
| | FREEZING | D3 | D2 | D1 | D1 | ns the commodity put in the shopping cart once to a
NOTIFICATION SYSTEM AND NOTIFICATION CONTROL APPARATUS USED IN THE SAME

CROSS-REFERENCE TO RELATED APPLICATION

This application is based upon and claims the benefit of priority from Japanese Patent Application No. 2017-139112, filed Jul. 18, 2017, the entire contents of which axe incorporated herein by reference.

FIELD

Embodiments described herein relate generally to a notification system and a notification control apparatus utilized in the notification system.

BACKGROUND

A notification may promote collection of a commodity if the commodity is placed at a location different from an original display location in a shop. In addition, a degree of urgency for the collection may be notified in accordance with a category of the commodity when notifying of collection. This is because a quality such as freshness of the commodity is gradually degraded if the commodity is placed at a location different from the original display location. It is required to place the commodity at an appropriate location to keep quality thereof.

DESCRIPTION OF THE DRAWINGS

FIG. 2 is a diagram schematically illustrating a structure of data record included in a display location database;

FIG. 3 is a diagram schematically illustrating a structure of a conformity degree table.

DETAILED DESCRIPTION

Even if a commodity is placed at a location different from an original display location, it is not always correct that a location at which the commodity is placed causes deterioration in quality of the commodity. For example, ice cream is a kind of the commodity that is typically collected urgently because the product value of the ice cream is lost once it melts. However, the quality of the ice cream is maintained even if the ice cream is erroneously placed in a showcase for frozen foods.

Therefore, it is not always correct that notification of a degree of urgency in collection in accordance with a category of a commodity is consistent with that of an actual degree of urgency in collection.

Taking such circumstances into consideration, it is desirable to provide a notification relating to an erroneous placement of a commodity in accordance with an actual degree of urgency in collection thereof.

A notification system according to at least one embodiment includes a detection module, an identification module, a notification module, a determination module, and a control module. The detection module detects that a commodity is placed at a display location. The identification module identifies the commodity. The notification module executes a notification operation with a plurality of different notification methods. The determination module determines a degree of conformity between the commodity identified by the identification module and the display location at which the commodity is placed. The control module controls the notification module such that the notification module executes the notification operation with one notification method associated to the degree of conformity determined by the determination module from the plurality of notification methods.

Hereinafter, certain embodiments are described with reference to the accompanying drawings. In certain embodiments, functions of a notification control unit are provided in a shop server as an example.

Figure 1:
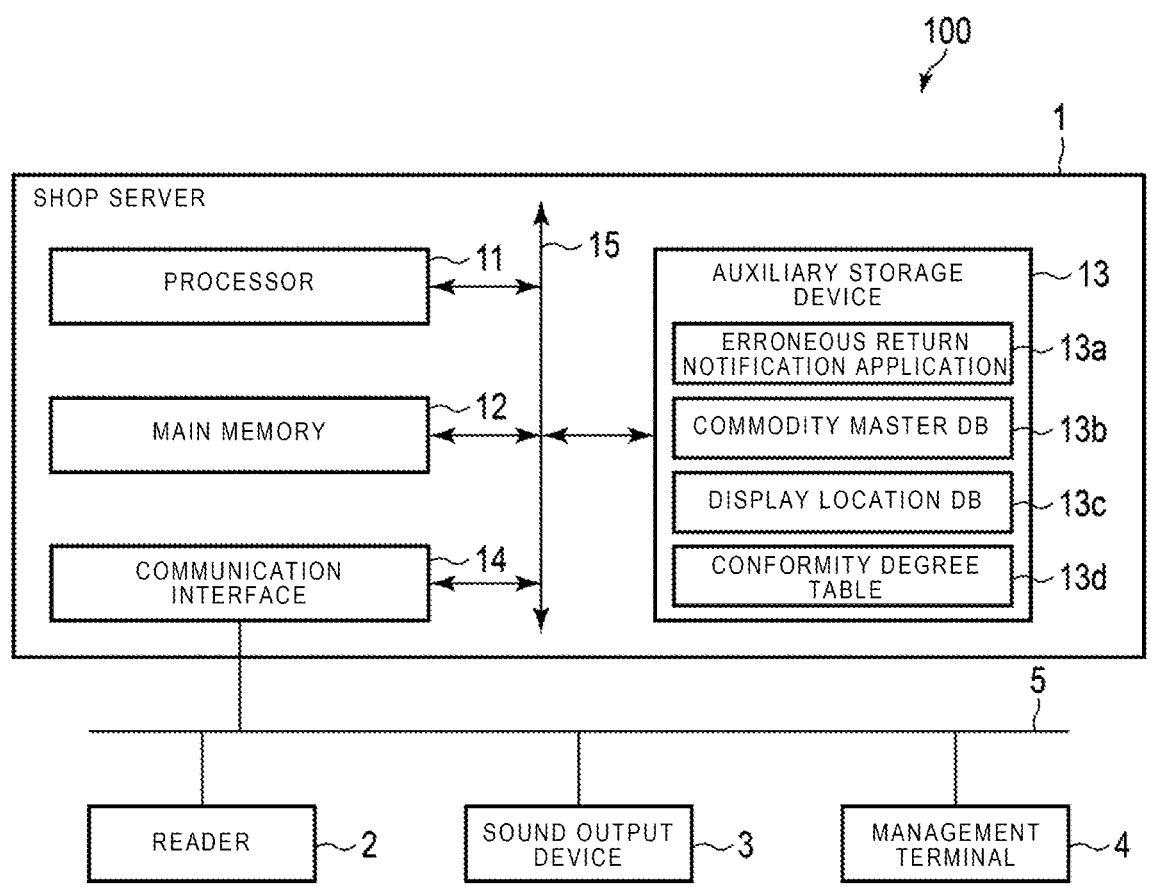
FIG. 1 is a block diagram illustrating an outline configuration of a notification system and a main circuit arrangement of a shop server included in the notification system according to at least one embodiment.

FIG. 1 is a block diagram illustrating an outline configuration of a notification system 100 and a main circuit arrangement of a shop server 1 included in the notification system 100 according to the embodiment.

The notification system 100 includes the shop server 1, a reader 2, a sound output device 3, and a management terminal 4. A plurality of readers 2 and sound output devices 3 are included in the notification system 100. In addition, a plurality of management terminals 4 may be included in the notification system 100. However, only one reader 2, one sound output device 3, and one management terminal 4 are illustrated in FIG. 1. The shop server 1, the readers 2, the sound output devices 3, and the management terminal 4 can communicate with each other via a communication network 5. The communication network 5 is a LAN (Local Area Network), for example. Note that at least a part of the shop server 1, the readers 2, the sound output devices 3, and the management terminal 4 may be connected to the communication network 5 via a wireless access point not illustrated in the drawing.

The shop server 1 is installed at a back office of a shop in which commodities to be sold are displayed, for example. The shop server 1 manages sales data for management relating to sales of the commodities in the shop. In addition, the shop server 1 controls a notification operation performed if a commodity is placed at a location different from an original display location thereof. Note that such an event in which a commodity is placed at a location different from the original display location occurs mainly when a customer returns the commodity put in the shopping cart once to a display location, for example. Thus, the aforementioned event is referred to as an erroneous return in the following description. However, this does not exclude a case in which shop staff erroneously places a commodity at a location different from the original display location.

The plurality of readers 2 are arranged in a distributed manner at display locations in the shop. The density and the number of readers 2 arranged in the shop are set in any manners. The readers 2 receive tag data transmitted by RFID (Radio Frequency Identifier) tags attached to commodities. The tag data includes a commodity code for identifying the commodity.

A plurality of sound output devices 3 are dispersively arranged in the shop. An arrangement (installation number and density) of the sound output devices 3 in the shop is arbitrarily set. The sound output device 3 outputs sound for an alert of the erroneous return to persons who are in the shop in response to an instruction from the shop server 1. The sound may be any one or both of voice message and alert sound. The sound output device 3 includes a speaker and a control unit for supplying a sound signal to the speaker in response to the instruction.

The management terminal 4 is installed in one or both of the shop and the back office. A plurality of management terminals 4 may be installed in each of a plurality of rooms where persons in charge of sales departments different each other work in the back office, for example. The management terminal 4 selectively executes a notification operation and an alert operation determined in advance for providing a notification that the erroneous return occurs in response to an instruction from the shop server 1. An information processing apparatus, such as a personal computer, is utilized as the management terminal 4, for example. Note that information processing apparatuses that the person in charge carries, such as a smart phone or a tablet terminal, may be used as the management terminal 4.

The shop server 1 includes a processor 11, a main memory 12, an auxiliary storage device 13, a communication interface 14, and a transmission path 15. An information processing apparatus can be used, for example, as hardware for the shop server 1.

In the shop server 1, a computer that controls the shop server 1 is formed by connecting the processor 11, the main memory 12, and the auxiliary storage device 13 with a transmission path 15.

The processor 11 acts as a central unit of the computer. The processor 11 executes information processing for realizing various functions of the shop server 1 according to an operating system and an application program.

The main memory 12 acts as a main storage unit of the computer. The main memory 12 includes a non-volatile memory region and a volatile memory region. The main memory 12 stores the operating system and the application program in the non-volatile memory region. In addition, the main memory 12 stores data necessary for the processor 11 to execute various kinds of information processing in the non-volatile memory region or the volatile region in some cases. The main memory 12 uses the volatile memory region as a work area in which the processor 11 appropriately rewrites data.

The auxiliary storage device 13 acts as an auxiliary storage unit in the computer. The auxiliary storage device 13 is, for example, an EEPROM (Electronic Erasable Programmable Read-Only Memory), an HDD (Hard Disc Drive), or an SSD (Solid-State Drive. The auxiliary storage device 13 saves data used by the processor 11 to perform various kinds of information processing and data generated in the processing performed by the processor 11. The auxiliary storage device 13 stores the application program.

The communication interface 14 performs a processing for data communication via the communication network 5.

The transmission path 15 includes an address bus, a data bus, a control signal line, and the like to transmit data and control signals exchanged between respective units connected to each other.

One of the application programs stored in the auxiliary storage device 13 in the present embodiment is an erroneous return notification application 13a. The erroneous return notification application 13a is a program in which information processing for controlling notification operations described later is described. In addition, a part of the storage region in the auxiliary storage device 13 is utilized as a commodity master database (commodity master DB) 13b, a display location database (display location DB) 13c, and a conformity degree table 13d.

The commodity master database 13b is a group of various kinds of information relating to the respective commodities that are dealt or sold in the shop. Information included in the commodity master database 13b includes temperature sections of commodities in addition to various kinds of well-known information included in the commodity master database, such as commodity codes, commodity names, unit, prices, and the like. Although any sect ions may be defined as the temperature sections, four sections, namely "heating", "normal temperature", "refrigerating", and "freezing" are defined in the present embodiment. These sections may be defined in accordance with a state in which commodities are respectively displayed. In one example, the temperature sections of commodities respectively displayed in a heating case, a refrigerating case, and a freezing case indicate "heating", "refrigerating", and "freezing", respectively. Temperature section of a commodity displayed on a display shelf with no heating or cooling function is defined as "normal temperature".

The display location database 13c is a group of data records including various kinds of information relating to a plurality of display locations in the shop.

FIG. 2 is a diagram schematically illustrating a structure of data records included in the display location database 13c.

Each data record corresponds to one of the plurality of display locations and includes data for managing the corresponding display location. Thus, the record is referred to as a display management data in the following description. The display management data includes fields F11, F12, F13, F14, F15, and F16. Information included in the fields F11 to F16 indicates a display location code, a temperature section, a reader code, a sound output device code, a management terminal code, and a commodity code. The display location code is defined for identifying a corresponding display location. The temperature section indicates the temperature states in which the commodity is to be displayed at the corresponding display location. Although any temperature sections may be defined, four sections, namely, "heating", "normal temperature", "refrigerating", and "freezing" are employed in the embodiment as described above. The reader code is used to identify each reader 2 installed to be able to read a tag data from a commodity displayed at a corresponding display location. The sound output device code is used to identify each sound output device 3 that outputs sound for an alert if the erroneous return to the corresponding display location occurs. As the sound output device code, a code assigned to each sound output device 3 which is able to output such sound that can be heard by persons (shoppers) who walks near the corresponding display location must be set. The management terminal code is used to identify each management terminal 4 for providing or issuing a notification or an alert if the erroneous return to the corresponding display location occurs. The commodity code is used to identify a commodity displayed at the corresponding display location. Note that, if a plurality of commodities are displayed together at the same corresponding display location, commodity codes for the plurality of commodities are included in the field F16.

FIG. 3 is a diagram schematically illustrating a structure of the conformity degree table 13d.

The conformity degree table 13d describes a degree of conformity defined in advance for a combination between a temperature section of a commodity and a temperature section of a display location. The degree of conformity is classified into three grades D1, D2, and D3. The degree of conformity decreases in the order of D1, D2 and D3.

In the example in FIG. 3, in a case in which the temperature section of the commodity and the temperature section of the display location are the same, the degree of conformity is set to be the maximum degree D1. Further, in a case in which the temperature section of the commodity is "freezing" while the temperature section of the display location is "heating", the degree of conformity is set to be the minimum degree D3. Note that which of the degrees of conformity is assigned to which of the combinations of temperature sections may be arbitrarily defined by a designer of the shop server 1 or a person who manages operations of the shop server 1.

The shop server 1 uses, for example, an information processing apparatus as hardware, and may be realized by writing the erroneous return notification application 13a in the auxiliary storage device 13 provided in the information processing apparatus as well as setting the commodity master database 13b, the display location database 13c, and the conformity degree table 13d. Note that the erroneous return notification application 13a may be stored in the auxiliary storage device 13 when the shop server 1 is transferred or may be transferred separately from the aforementioned information processing apparatus. In the latter case, the erroneous return notification application 13a is transferred by being recorded in a removable recording medium such as a magnetic disk, a magneto-optic disc, an optical disc, or a semiconductor memory or via a network.

Next, operation of the notification system 100 arranged as described above is described.

If a customer places a commodity that a customer picks up from an original display location once, at another display location, a reader 2 the communication range of which includes the display location can receive a tag data of the aforementioned placed commodity to function as a detection module (a detector). Thus, the reader 2 detects that the commodity is placed at the display location by receiving the tag data. If the reader 2 receives the tag data, then the reader 2 transmits detection notification data including the tag data and a reader code assigned to the reader 2 to the communication network 5, addressing to the shop server 1.

Then, the detection notification data is delivered to the shop server 1 through the communication network 5, and the communication interface 14 receives the detection notification data, which is stored in the main memory 12 or the auxiliary storage device 13.

In response to the reception of the detection notification data as described above, the processor 11 starts information processing described later in accordance with the erroneous return notification application 13a. Note that content of the processing described below is just an example and a variety of kinds of processing by which similar results can be obtained can be arbitrarily utilized.

Figure 4:
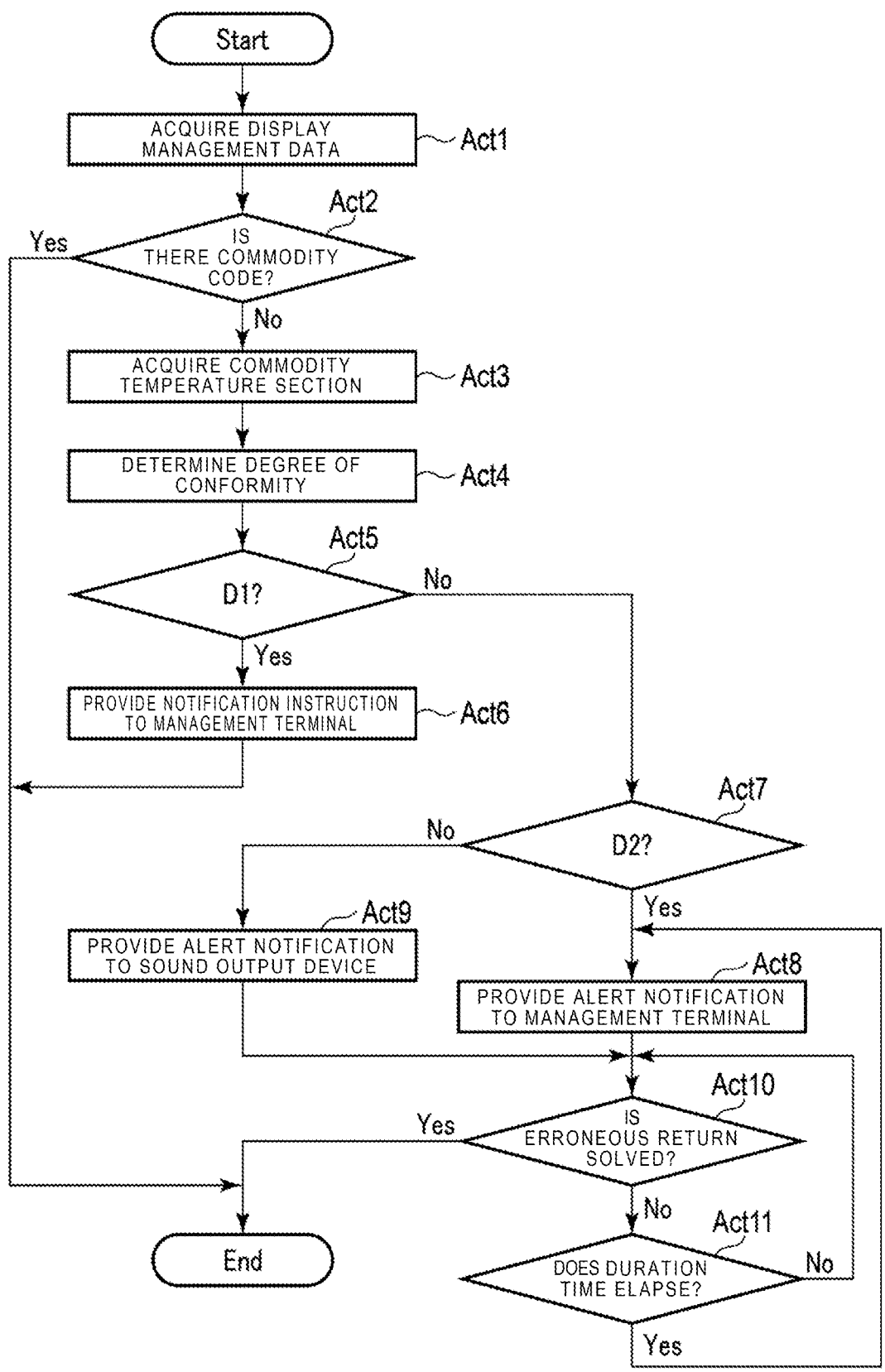
FIG. 4 is a flowchart illustrating information processing by a processor shown in FIG. 1 according to an erroneous return notification application.

FIG. 4 is a flowchart of information processing performed by the processor 11 according to the erroneous return notification application 13a.

In Act 1, the processor 11 acquires one of a plurality of display management data included in the display location database 13c. The display management data acquired by the processor 11 includes the field F13 in which a reader code coincident with the reader code included in the received detection notification data is stored.

In Act 2, the processor 11 confirms whether or not a commodity code included in the received detection notification data (hereinafter referred to as a returned commodity code) is included in the field F16 of the aforementioned acquired display management data. In this processing, the processor 11 identifies the returned commodity and checks whether or not the returned commodity is a commodity displayed at a display location. In this manner, a computer with the processor 11 serving as a central unit functions as the identification module (identifier) by the processor 11 executing the information processing according to the erroneous return notification application 13a. If the returned commodity code is included in the display management data, then the processor 11 takes YES in ACT 2 and ends the information processing. That is, since the commodity is appropriately returned to the original display location in this case, the processor 11 does not perform any of various kinds of notification processing described later. Note that there is also a case in which the reader 2 includes display locations of a plurality of commodities within a communication range. In this case, the processor 11 regards the commodity as being appropriately placed even if the commodity is placed at another display location that is adjacent to the original display location and thus takes YES in ACT 2. In order to avoid this situation, the reader 2 is installed such that it includes only a display location of one commodity in the communication range. Note that it is desirable that the reader 2 be not installed to include both display locations of different temperature sections within the communication range.

However, the processor 11 takes NO in ACT 2 and executes a processing in Act 3 if the return commodity code is not included in the display management data. In this case, the commodity is placed at a display location different from the original display location, and the processor 11 executes the following processing to address this situation.

In Act 3, the processor 11 acquires a temperature sect ion of the commodity identified by the return commodity code from the commodity master database 13b.

In Act 4, the processor 11 determines the degree of conformity on the basis of the conformity degree table 13d from the temperature section indicated in the display management data acquired in Act 1 and the temperature section acquired in Act 3. In one example, the processor 11 determines that the degree of conformity as D2 if the temperature section indicated in the display management data acquired in Act 1 is "heating" and the temperature section acquired in Act 3 is "refrigerating". In this manner, the computer with the processor 11 serving as a central unit functions as the determination module by the processor 11 executing the information processing according to the erroneous return notification application 13a.

In Act 5, the processor 11 confirms whether or not the aforementioned determined degree of conformity is D1. If the degree of conformity is D1, then the processor 11 takes YES and then executes a processing in Act 6.

In Act 6, the processor 11 provides a notification instruction to the management terminal 4 identified by the management terminal code indicated in the display management data acquired in Act 1. Then, the processor 11 ends the information processing illustrated in FIG. 4 after the processing in ACT 6.

The management terminal 4 receives the notification instruction and then executes a notification operation for notifying a person in charge to pay attention to occurrence of the erroneous return and address the erroneous return. The notification operation may be performed with any method through display of a character messages or an image on a display device, through an output of alarm sound, or the like. Note that, in a shop such as a supermarket, a large sales area is divided into a plurality of areas and the respective areas are under control of the respective sales departments such as "meat", "fish", and "frozen foods", for example. Thus, display management data is set such that a management terminal 4 installed in a room where a person in charge of a sales department, to which the display location where the commodity is erroneously placed belongs, is working is a destination of the aforementioned notification instruction. In this manner, it is possible for the person in charge to easily find the commodity erroneously placed, by checking display locations in the area of which the person is in charge. However, if the management terminal 4 displays the display location the commodity is erroneously placed, the person in charge can quickly address the erroneous placement according to the display. In this case, the processor 11 may notify the management terminal 4 of the display location code in Act 6. In addition, it is further preferable that the management terminal 4 displays the commodity erroneously placed. According to the display, the person in charge can significantly easily find the commodity erroneously placed. In this case, line processor 11 may notify the management terminal 4 of the commodity code in Act 6.

Incidentally, if the degree of conformity determined in Act 4 is not D1, then the processor 11 takes NO in Act 5 and executes a processing in Act 7.

In Act 7, the processor 11 confirms whether or not the aforementioned determined degree of conformity is D2. If the degree of conformity is D2, then the processor 11 takes YES and executes a processing in Act 8.

In Act 8, the processor 11 provides an alert instruction to the management terminal 4 identified based on the management terminal code indicated in the display management data acquired in Act 1.

The management terminal 4 receives the alert notification and then executes an alert operation for issuing an alert to urge the person in charge to urgently address occurrence of the erroneous return. The alert operation may be performed with any method through display of a character message or an image on a display device, through an output of alarm sound, or the like. However, the management terminal 4 performs such an alert operation that, for example, the management terminal 4 increases the volume of the alert sound as compared with that in the notification operation. With this alert sound having a louder volume, the person in charge certainly perceives occurrence of the erroneous return. Note that the management terminal 4 may indicate the commodity and the location at which the commodity is erroneously placed through a display in the alert operation as similar to that in the notification operation. However, it is more desirable in the alert operation that such an indication is performed to enable quicker countermeasure.

Meanwhile, if the degree of conformity is D3 rather than D2, the processor 11 takes NO in Act 7 and executes a processing in Act 9.

In Act 9, the processor 11 provides an alert instruction to the sound output device 3 identified based on the sound output device code indicated in the display management data acquired in Act 1.

The sound output device 3 receives the alert instruction and then outputs sound for alerting that erroneous return occurs near the sound output device 3. The sound output device 3 outputs a voice message such as "Customer who returns the commodity into a display case, please check if you return the commodity to the original location" after the alert sound for attracting attention of shoppers around the customer. In this manner, the alert is immediately issued if the customer places a frozen food in a heating case, for example. Note that there is a concern that the alert sound causes other customers to be frightened if such customers are present, around the customer who erroneously returns the commodity because such customers also can hear the alert sound. However, it can expect a psychological effect such that the customer who erroneously returns the commodity thinks "I should quickly address the erroneous return" by allowing the customers around him or her to hear the alert sound. In addition, it can also expect a psychological effect of dissuading a customer from playfully and/or intentionally returning a commodity to an inappropriate display location.

The computer with the processor 11 serving as a central unit functions as the control module (controller) by the processor 11 performing the processing in Act 5 to Act 9 according to the erroneous return notification application 13a as described above. The sound output device 3 and the management terminal 4 are examples of the notification module (notifier) and the notification device, respectively.

If the processing in Act 8 or Act 9 is ended, the processor 11 executes a processing in Act 10 in both cases. However, it is also considered that the customer does not take an appropriate countermeasure in response to the alert operation performed by the sound output device 3. Thus, the processor 11 may re-execute the processing in Act 8 after the processing in Act 9.

In Act 10, the processor 11 confirms whether or not the state of the erroneous return is solved. If the state is not solved, then the processor 11 takes NO and executes a processing in Act 11.

In Act 11, the processor 11 checks whether or not a predetermined duration time elapses after executing the processing in Act 10 from the processing in Act 8 or Act 9. If the duration time does not elapse, then the processor 11 returns to the processing in Act 10.

In this manner, the processor 11 waits for until the state of the erroneous return is solved or until the duration time elapses in Act 10 and Act 11. If the duration time elapses without the state of the erroneous return being solved, then the processor 11 takes YES in Act 11 and re-executes the processing in Act 8.

In Act 10, the processor 11 confirms whether or not the reader that transmits the detection notification data that triggers the start of the information processing illustrated in FIG. 4 detects a return commodity code. If the reader does not detect any return commodity code, the processor 11 takes YES. Alternatively, the processor 11 may take YES in Act 10 in response to a predetermined operation for declaring that the customer or the person in charge already addresses the erroneous return by the customer or the person in charge. If the processor 11 takes YES in Act 10, then the processor 11 ends the information processing.

According to the notification system 100 described above, an operation to be executed to provide a notification is changed on the basis of a degree of conformity between a commodity and a display location at which the commodity is erroneously placed. Therefore, the notification relating to the erroneous placement of the commodity can be executed with content according to a degree of urgency of collection thereof.

According to the notification system 100, the aforementioned degree of conformity is determined based on a relationship between a temperature section of a commodity and a temperature section of a display location. Therefore, an appropriate notification operation can be performed in consideration of a difference in speed of degradation of the commodity caused by a comparatively larger or smaller relation of the degree of conformity.

According to the notification system 100, the management terminal 4 performs the alert, operation again if the inappropriate state in which the commodity is placed at an inappropriate display location is not solved even after the duration time elapses regardless of the alert notification by the sound output device 3 or the management terminal 4. That is, if the customer or the person in charge does not appropriately take a countermeasure in response to the alert notification, the alert notification to the person in charge is repeated. In this manner, the state where the countermeasure to be urgently taken is not taken is prevented from being left over a long period of time. Note that there is a high possibility that the customer who returns the commodity at an inappropriate location already leaves the location if the duration time elapses after the sound output device 3 performs the alert operation. Therefore, there is a concern that the alert executed by the sound output device 3 at this point may bother other customers. Thus, such a bothering situation can be prevented from occurring by switching the operation to the alert operation performed by the management terminal 4.

Various modifications of the present embodiment can be made as follows.

The detection unit of the present embodiment may be replaced to another type thereof such as one that detects that a commodity is placed at a display location through image processing performed on an image data obtained by a camera photographing the display location, for example, or a plurality of types thereof may be used in combination.

Any notification operations may be performed as arbitrary operations that can be perceived by persons, such as a display, a beeping, vibration, or the like.

The degree of conformity is not limited to definition based on the temperature section and may arbitrarily be defined. For example, degrees of conformity for display locations which are classified into a plurality of kinds thereof are assigned to respective commodities.

A part of the aforementioned information processing performed by the processor 11 may be omitted. For example, the processor 11 may end the processing in FIG. 4 without performing Act 10 and Act 11 in FIG. 4 if the processor 11 ends Act 8 or Act 5. Alternatively, the processor 11 may perform Act 10 and Act 11 only when the processor 11 ends Act 9 and may just end the processing in FIG. 4 when the processor ends Act 8, for example.

The notification control apparatus may be realized by executing the information processing illustrated in FIG. 4 by the management terminal 4 or an information processing apparatus that already exists for another purpose or may be realized as a device that executes the information processing illustrated in FIG. 4 as a main function.

Apart or an entirety of the respective functions realized by the processor 11 that executes the information processing can also be realized by hardware such as a logic circuit that executes information processing without a program (software). In addition, the respective functions described above can be realized by combining the hardware such as a logic circuit with a software control.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A notification system comprising:
   a detector configured to detect that a commodity is placed at a display location;
   an identifier configured to identify the commodity;
   a notifier configured to execute a notification operation using at least one of a plurality of different notification methods; and
   at least one storage device configured to store data including
      commodity data including data relating to a temperature section associated with the commodity, and
      display location data including data relating to a temperature section of the display location at which the commodity is placed;
   a processor configured to determine a degree of conformity between the commodity identified by the identifier and the display location at which the commodity is placed based on a combination of (i) the temperature section associated with the commodity identified by the identifier and (ii) the temperature section of the display location where the commodity is placed; and
   a controller configured to control the notifier such that the notifier executes the notification operation with at least one notification method associated with the degree of conformity determined by the processor from the plurality of notification methods.

2. The system according to claim 1, wherein the notifier includes a plurality of notification devices which execute the notification operation at different locations.

3. The system according to claim 1,
   wherein the controller is programmed to cause the notifier to not execute the notification operation when the display location at which the commodity is placed is defined as the display location of the commodity.

4. The system according to claim 1, wherein the controller is configured to cause the notifier to vary at least one of a volume or a destination of the notification.

5. The system according to claim 1, wherein the processor is configured to cause the notifier to output a second notification at a higher volume than a first notification after an elapse of a predetermined duration of time.

6. The system according to claim 5, wherein the controller is configured to determine whether the commodity is returned to the display location of the commodity after the elapse of the predetermined duration of time.

7. A notification control apparatus for a notification system including a detector for detecting that a commodity is placed at a display location, an identifier for identifying the commodity, and a notifier for executing a notification operation using at least one of a plurality of different notification methods, the apparatus comprising:
   at least one storage device configured to store data including
      commodity data including data relating to a temperature section associated with the commodity, and
      display location data including data relating to a temperature section of the display location at which the commodity is placed;
   a processor configured to determine a degree of conformity between the commodity identified by the identifier and the display location at which the commodity is placed based on a combination of (i) the temperature section associated with the commodity identified by the identifier and (ii) the temperature section of the display location where the commodity is placed; and
   a controller configured to control the notifier such that the notifier executes the notification operation with at least one notification method associated with the degree of conformity determined by the processor from the plurality of notification methods.

8. The apparatus according to claim 7, wherein the notifier includes a plurality of notification devices which execute the notification operation at different locations.

9. The apparatus according to claim 7,
wherein the controller is programmed to cause the notifier not to execute the notification operation when the display location at which the commodity is placed is defined as the display location of the commodity.

10. The apparatus according to claim 7, wherein the controller is configured to cause the notifier to vary at least one of a volume or a destination of the notification.

11. The apparatus according to claim 7, wherein the processor is configured to cause the notifier to output a second notification at a higher volume than a first notification after an elapse of a predetermined duration of time.

12. The apparatus according to claim 11, wherein the controller is configured to determine whether the commodity is returned to the display location of the commodity after the elapse of the predetermined duration of time.

13. A method of performing a notification operation in a notification system including a detector for detecting that a commodity is placed at a display location, an identifier for identifying the commodity, and a notifier for executing a notification operation using at least one of a plurality of different notification methods, the method comprising:
storing, in at least one storage device, data including commodity data including data relating to a temperature section associated with the commodity, and display location data including data relating to a temperature section of the display location at which the commodity is placed;
determining a degree of conformity between the commodity identified by the identifier and the display location at which the commodity is placed based on a combination of (i) the temperature section associated with the commodity identified by the identifier and (ii) the temperature section of the display location where the commodity is placed; and
executing the notification operation with at least one notification method associated with the determined degree of conformity from the plurality of notification methods.

14. The method according to claim 13, further comprising executing the notification operation at different locations.

15. The method according to claim 13, further comprising
not executing the notification operation when the display location at which the commodity is placed is defined as the display location of the commodity.

16. The method according to claim 13, further comprising varying at least one of a volume or a destination of the notification.

17. The method according to claim 16, further comprising outputting a second notification at a higher volume than a first notification after an elapse of a predetermined duration of time.

18. The method according to claim 17, further comprising determining whether the commodity is returned to the display location of the commodity after the elapse of the predetermined duration of time.

* * * * *